United States Patent
Shattuck (10) Patent No.: US 7,971,032 B2
(45) Date of Patent: Jun. 28, 2011

(54) SYSTEM FOR NATIVE CODE EXECUTION

(75) Inventor: Charles W. Shattuck, Roseville, CA (US)

(73) Assignee: VNS Portfolio LLC, Cupertino, CA (US)

( * ) Notice: Subject to any disclaimer, the term of this patent is extended or adjusted under 35 U.S.C. 154(b) by 431 days.

(21) Appl. No.: 12/254,709

(22) Filed: Oct. 20, 2008

(65) Prior Publication Data

US 2009/0138677 A1 May 28, 2009

Related U.S. Application Data

(60) Provisional application No. 61/002,999, filed on Nov. 14, 2007.

(51) Int. Cl.
*G06F 9/30* (2006.01)
*G06F 9/40* (2006.01)
*G06F 15/00* (2006.01)

(52) U.S. Cl. ........................................ 712/209
(58) Field of Classification Search ............... 712/209
See application file for complete search history.

(56) References Cited

U.S. PATENT DOCUMENTS

| | | | |
|---|---|---|---|
| 6,820,252 B2 * | 11/2004 | Sakamoto et al. | 717/136 |
| 2002/0184399 A1 * | 12/2002 | Bak et al. | 709/310 |
| 2003/0149964 A1 * | 8/2003 | Hoogerbrugge et al. | 717/138 |
| 2004/0015972 A1 * | 1/2004 | Barclay | 718/102 |

* cited by examiner

*Primary Examiner* — Eddie P Chan
*Assistant Examiner* — Corey Faherty
(74) *Attorney, Agent, or Firm* — Henneman & Associates, PLC; Larry E. Henneman, Jr.

(57) ABSTRACT

A process, apparatus, and system to execute a program in an array of processor nodes that include an agent node and an executor node. A virtual program of tokens of different types represents the program and is provided in a memory. The types include a run type that includes native code instructions of the executer node. A token is loaded from the memory and executed in the agent node based on its type. In particular, if the token is an optional stop type execution ends and if the token is a run type the native code instructions in the token are sent to the executor node. The native code instructions are executed in the executor node as received from the agent node. And such loading and execution continues in this manner indefinitely or until a stop type token is executed.

22 Claims, 5 Drawing Sheets

SYSTEM FOR NATIVE CODE EXECUTION

CROSS-REFERENCE TO RELATED APPLICATIONS

This application claims the benefit of U.S. Provisional Application No. 61/002,999, filed Nov. 14, 2007, hereby incorporated by reference in its entirety.

BACKGROUND OF THE INVENTION

1. Technical Field

The present invention relates generally to electrical computers and digital processing systems, and more particularly to subject matter which controls the structure joining the processing elements by partitioning the array into groups of processing elements.

2. Background Art

Writing software programs oftentimes requires making tradeoffs between program size and program functionality. When a program is written to be compact or short it generally is not overly complex, and can be executed with speed and without requiring a lot of processor and memory resources. Conversely, longer programs can perform more tasks and more complex tasks but they typically require greater amounts of resources, particularly including processor registers, working memory, program storage memory, and processor cycles to work with these as well as to execute the entire underlying program.

A conventional approach to writing software for a target machine is to write in the native machine language and load the program into the local random access memory (RAM) of the target machine. In this approach the size of the program that can be stored in the local RAM is limited by the size of the local RAM. However, it is impossible to have a fixed RAM size that will always be big enough.

An alternative approach is to create a virtual machine in the limited local random access memory (RAM) that can execute virtual instructions read from external memory. A virtual machine like eForth performs this task but is limited to executing a certain number of subroutines over and over, sometimes called primitives. Also, eForth is slowed by the need to maintain stacks in external memory.

There exists a need to execute native machine code that may not always fit in the local RAM. Furthermore, the process of fetching the native code by storing it externally should not unduly delay the execution of the native code.

BRIEF SUMMARY OF THE INVENTION

Accordingly, it is an object of the present invention to provide a system for native code execution.

Briefly, one preferred embodiment of the present invention is a process to execute a program in an array of processor nodes that includes an agent node and an executor node. A virtual program is provided in a memory to represent the program. This virtual program includes tokens of different types, including at least one run type that includes native code instructions of the executer node. A token is loaded from the memory into the agent node. Then the token is executed in the agent node based on its type. In particular, if a token is a run type, executing includes sending the native code instructions in the token to the executer node. The native code instructions are executed in the executer node as they are received from the agent node. And such loading and executing continues, potentially indefinitely.

Briefly, another preferred embodiment of the present invention is an apparatus for executing a program. An array of at least two processor nodes is provided. One processor node is an agent node and another is an executer node. The agent node includes logics that maintain a virtual program counter and obtain tokens from a memory of a virtual program that represent the program. The tokens are of different types, including at least one run type that includes native code instructions of the executer node. The agent node also includes a logic that executes the tokens and a logic that writes the native code instructions in a run type token to the executer node. The executer node includes logics that read the native code instructions from the agent node and that execute the native code instructions.

These and other objects and advantages of the present invention will become clear to those skilled in the art in view of the description of the best presently known mode of carrying out the invention and the industrial applicability of the preferred embodiment as described herein and as illustrated in the figures of the drawings.

BRIEF DESCRIPTION OF THE SEVERAL VIEWS OF THE DRAWING(S)

The purposes and advantages of the present invention will be apparent from the following detailed description in conjunction with the appended figures of drawings in which.

In the various figures of the drawings, like references are used to denote like or similar elements or steps.

DETAILED DESCRIPTION OF THE INVENTION

A preferred embodiment of the present invention is a system for executing native code. As illustrated in the various drawings herein, and particularly in the view of FIG. 3, preferred embodiments of the invention are depicted by the general reference character 100.

Figure 3:
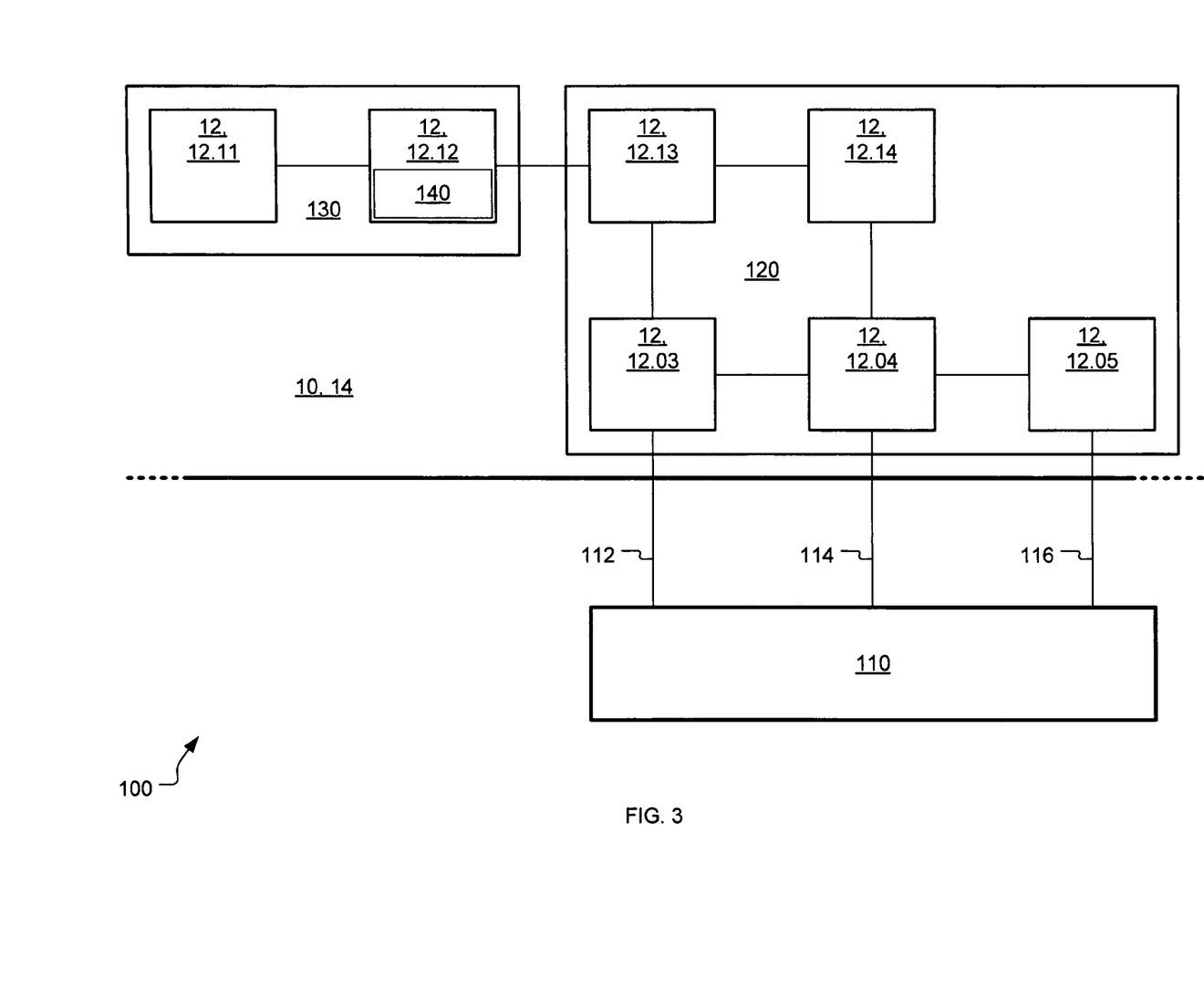
FIG. 3 is a diagrammatic view of a portion of an array of nodes being used in accord with the inventive native code execution system.

The inventive native code execution system 100 permits executing a program that is typically too long to be executed normally in the available computer hardware. The computer hardware has native code instructions or "opcodes" that are classifiable as either arithmetic logic unit (ALU) class opcodes (e.g., to perform stack, register, bit-wise and math operations) or memory class opcodes (e.g., to perform branch and memory operations). The portions of the program that are represented with ALU class opcodes can be executed normally in the computer hardware, whereas the portions of the program that would conceivably be represented with memory class opcodes often cannot be because such opcodes cannot access an address space larger than that of the computer hardware.

Briefly, the inventive native code execution system 100 handles this by using a virtual program of tokens and bifurcating the responsibility for executing this virtual program to two nodes of an array of computer nodes. One of the two nodes is an AGENT node and the other is an EXECUTOR node. The role of the AGENT node is to act as an interface to execute the tokens as they are received from a memory (typically a memory that is external from the array). Most of the various tokens are used by the AGENT node to stop, start, and otherwise run the virtual program. In particular, however, at least one of the tokens includes one or more native code instructions that the AGENT node reads in and writes to a port to the EXECUTOR node, for the EXECUTOR node to then execute. In this manner the AGENT node executes the tokens, and thus the virtual program, and the EXECUTOR node executes the native code instructions that it receives. The native code instructions that the EXECUTOR node receives will be all or mostly ALU class opcodes, but the EXECUTOR node may also be permitted to receive and execute memory class opcodes that properly address the address space of the actual computer hardware. The net result of this bifurcated approach is that the program is effectively virtualized and executed in the available hardware (nodes) without altering the structure of the underlying program.

Figure 1:
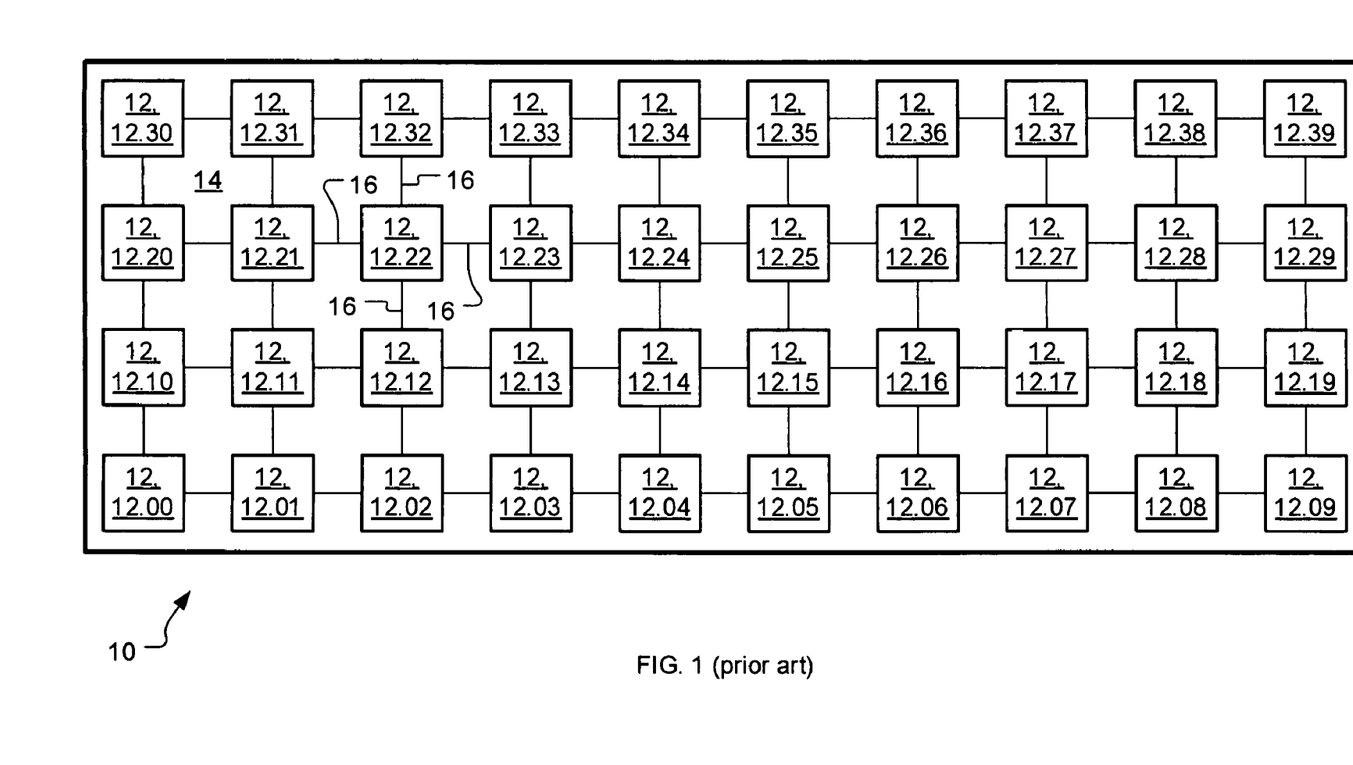
FIG. 1 (prior art) is a diagrammatic view of an array of computers, cores, or nodes that may be used with the present invention.

FIG. 1 (prior art) is a diagrammatic view of an array 10 (forty are shown) of computers, cores, or nodes that may be used with the present invention. The array 10 here may particularly be a SEAforth® 40C18 device by IntellaSys® Corporation of Cupertino, Calif., a member of the TPL Group of companies, and for the sake of example the following discussion proceeds on this basis. When discussing the microprocessors in the SEAforth® 40C18 device, the term "nodes" is usually used and in the following discussion these are referred to collectively as nodes 12 and individually as nodes 12.00-12.39. The array 10 of nodes 12 in a SEAforth® 40C18 device is implemented in a single semiconductor die 14, wherein each of the nodes 12 is a generally independently functioning digital processor that is interconnected to its adjacent nodes by interconnecting data buses 16.

Figure 2:
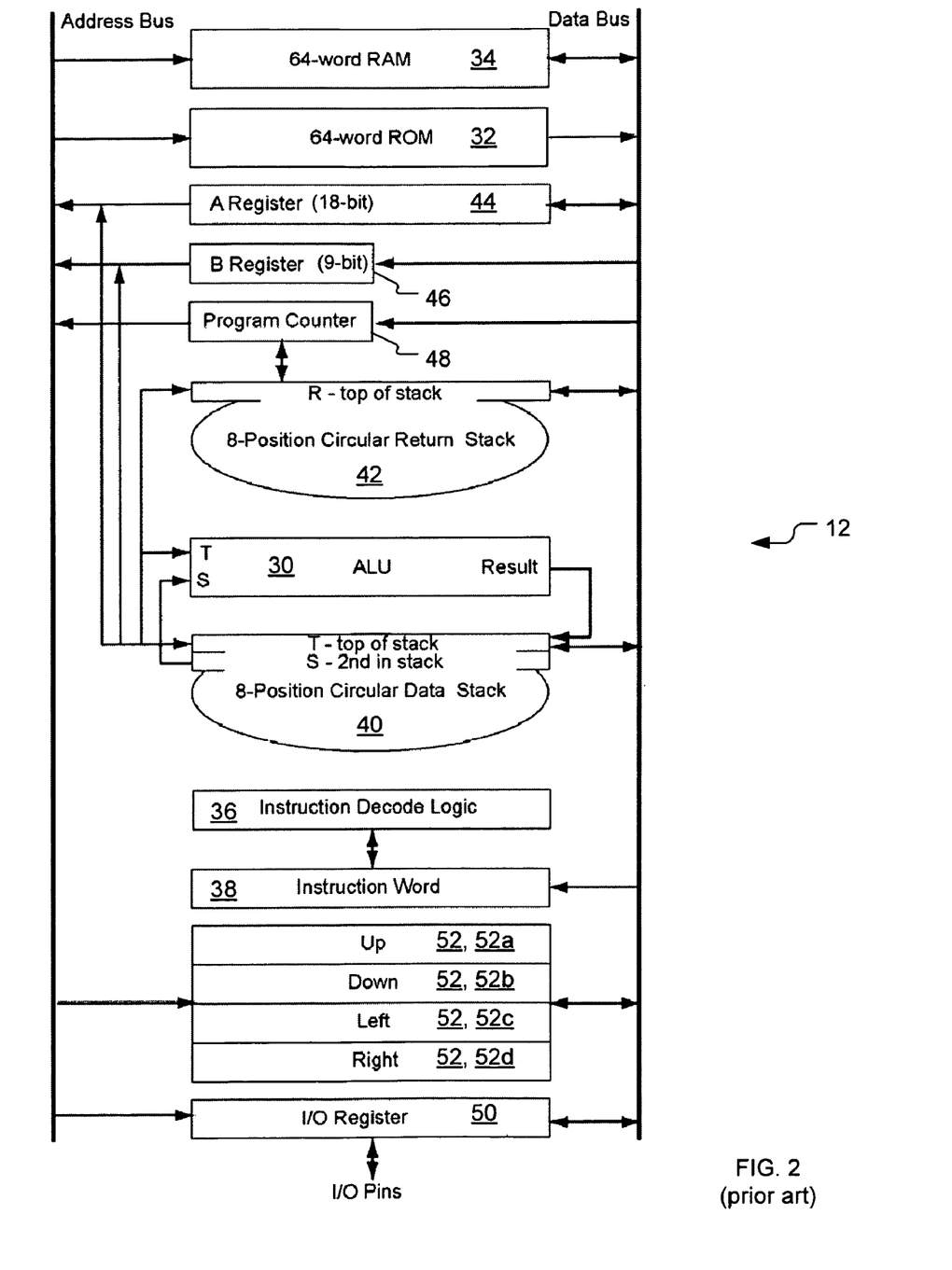
FIG. 2 (prior art) is a diagrammatic view of the major internal features of one of the nodes in FIG. 1.

FIG. 2 (prior art) is a diagrammatic view of the major internal features of one of the nodes 12 in FIG. 1, that is, of each of the nodes 12.00-12.39. As can be seen, each node 12 is generally an independently functioning digital processor, including an arithmetic logic unit (ALU 30), a quantity of read only memory (ROM 32), a quantity of random access memory (RAM 34), an instruction decode logic section 36, an instruction word 38, a data stack 40, and a return stack 42. Also included are an 18-bit "A" register (A-register 44), a 9-bit "B" register (B-register 46), a 9-bit program counter register (P-register 48), and an 18-bit I/O control and status register (IOCS-register 50).

Further included are four communications ports (collectively referred to as ports 52, and individually as ports 52a-d). Except for some of the edge and corner nodes 12, these ports 52 each connect to a respective data bus 16 (FIG. 1), wherein each data bus 16 has 18 data lines, a read line, and a write line (not shown individually in FIG. 1-2). The SEAforth® 40C18 device is particularly noteworthy in that its ports 52 are mapped into its memory address space, meaning that its machine code instructions can execute in a port 52 as if they were instead executing from an address in random access memory (RAM) or read only memory (ROM). As also shown in FIG. 2, the ports 52 can be referred to as having up, down, left, and right directionalities. Similarly, the nodes 12 and their ports 52 can each be referred to as having north, south, east, or west directionalities. For example, in FIG. 1 node 12.03 is "west" of node 12.04 and node 12.13 is "north" of node 12.03. The west port 52, 52c of node 12.04 connects it to node 12.03 and the east port 52, 52d of node 12.03 connects it to node 12.04 (via the same data bus 16).

FIG. 3 is a diagrammatic view of a portion of an array 10 of nodes 12 being used in accord with the inventive native code execution system 100. The native code execution system 100 executes a program that is represented with tokens (described presently) and it is expected that such a program will typically be long, and thus that the quantity of tokens needed will require a substantial amount of memory (the tokens storage 110 in FIG. 3). In the inventor's presently preferred embodiment, the tokens storage 110 is in external Synchronous Dynamic Random Access Memory (SDRAM) and a data line 112, a control line 114, and an address line 116 connect the tokens storage 110 to the nodes 12 in the array 10.

Of course, other approaches to this are also possible. For example, specialized hardware (other than the SEAforth® 40C18 device and external SDRAM) may be used, wherein the memory for tokens storage and an array of nodes are fabricated on the same die. Such would tend to be expensive, however, and thus probably limited to specialized applications.

Continuing with FIG. 3, nodes 12.03, 12.04, 12.05, 12.13, and 12.14 are employed by a storage driver 120 that interacts with the tokens storage 110. The tokens storage 110 stores n-bit words, which here are 18-bit words to coincide with the 18-bit features of the SEAforth® 40C18 device. The data line 112 connects the south port 52b of node 12.03 to the tokens storage 110, the control line 114 connects the south port 52b of node 12.04 to the tokens storage 110, and the address line 116 connects the south port 52b of node 12.05 to the tokens storage 110. In general, the data line 112, control line 114, address line 116, the memory used for the tokens storage 110, and the storage driver 120 hardware features can all be straightforward and conventional in nature.

In the inventive native code execution system 100, a virtual machine 130 executes virtual instructions using node 12.11 as an EXECUTOR node and node 12.12 as an AGENT node. For this the AGENT node 12.12 particularly includes a state machine 140, described presently, and maintains a virtual program counter on the top of its own data stack 40. As part of maintaining this virtual program counter it is incremented after each read operation.

The virtual instructions represent the program that the native code execution system 100 is to execute and these here are embodied as ten types of tokens that are herein collectively referred to as tokens 150 and individually referred to as tokens 150a-j.

Figure 4:
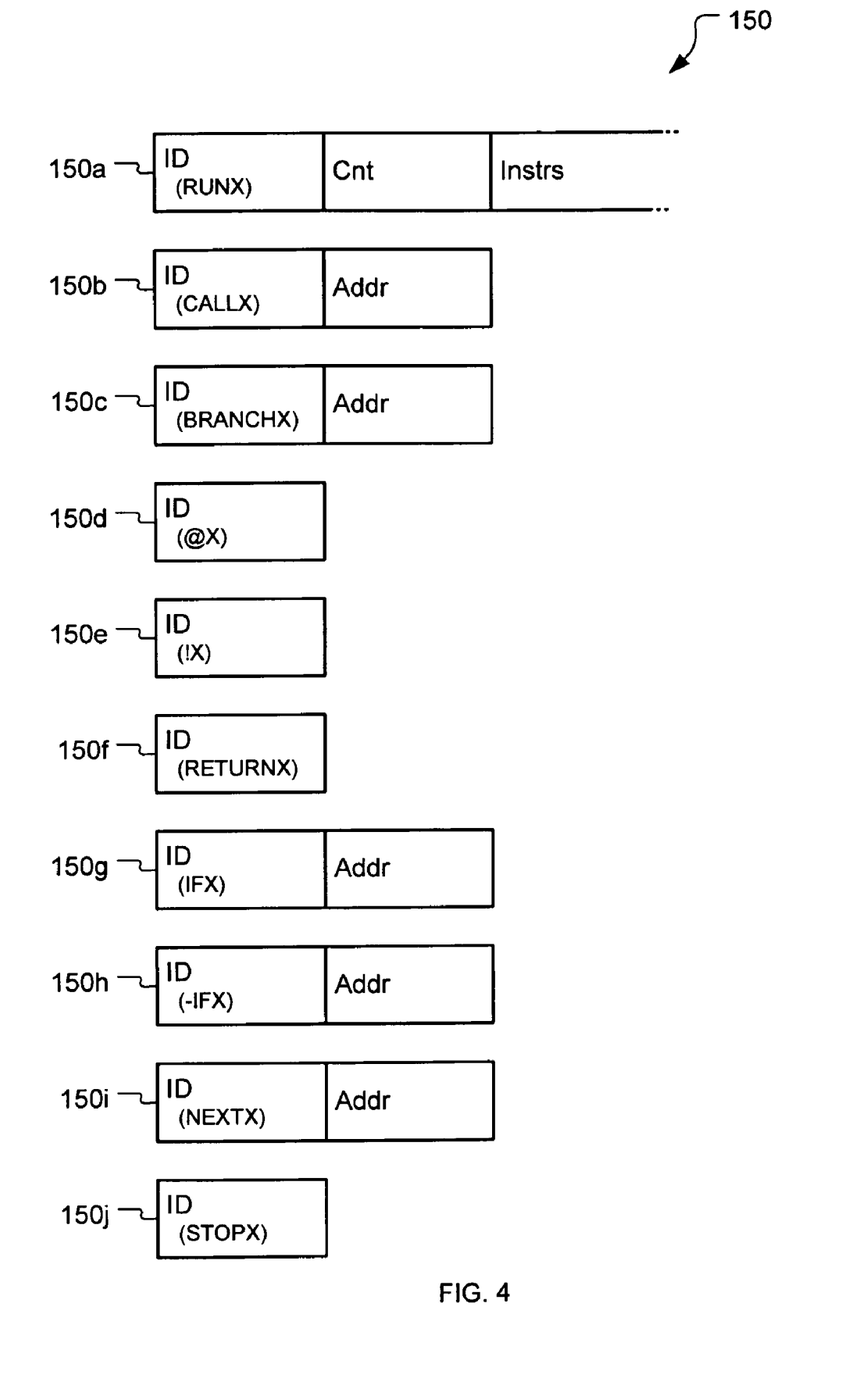
FIG. 4 is a block diagram stylistically depicting tokens and their features, as used by the embodiment of the native code execution system in FIG. 3.

FIG. 4 is a block diagram stylistically depicting these ten tokens 150, 150a-j and their features. The first type of token 150 is the RUNX token 150a. This token occupies a variable number of words, wherein the first identifies the token, the second is a count, and the rest of the words contain native machine code. Upon receiving the identifier word for this token from the tokens storage 110, the AGENT node 12.12: (1) increments the virtual program counter to point to the next location in the tokens storage 110 (since this is done after every read, we dispense with listing it further below); (2) reads the next word (a count) from the tokens storage 110 at the location now pointed to by the virtual program counter; (3) pushes the count onto its own return stack 42; and (4) executes a for-next loop for the specified count where it: (a) reads a word of native machine code from the tokens storage 110; and (b) writes the word to the EXECUTOR node 12.11 for execution there.

The second type of token 150 is the two-word CALLX token 150b, wherein the first word identifies the token and the second is an address. Upon receiving the identifier word here the AGENT node 12.12: (1) reads the next word (an address) from the tokens storage 110; (2) puts the virtual program counter onto the return stack 42 of the EXECUTOR node 12.11; and (3) puts the address onto the top of its own data stack 40, thus replacing the current virtual program counter with a new virtual program counter.

The third type of token 150 is the two-word BRANCHX token 150c, wherein the first word identifies the token and the second is an address. Upon receiving the identifier word here the AGENT node 12.12: (1) reads the next word (an address) from the tokens storage 110; and (2) replaces the virtual program counter in its own data stack 40 with the address, thus specifying a location in the tokens storage 110 from which to fetch the first word of the next token 150.

The fourth type of token 150 is the one-word @X token 150d (pronounced "fetch X"), wherein the single word simply identifies the token. This token may be used to fetch a variable or address to operate on for later use and is typically used in conjunction with the !X token. Upon receiving the identifier word here the AGENT node 12.12: (1) destructively gets an address from the top of the data stack 40 of the EXECUTOR node 12.11; (2) fetches a word from the address in the tokens storage 110; and (3) pushes the word onto the top of the data stack 40 of the EXECUTOR node 12.11.

The fifth type of token 150 is the one-word !X token 150e (pronounced "store X"), wherein the single word simply identifies the token. This token may be used to store a variable or address for later use and is typically used in conjunction with the @X token. Upon receiving the identifier word here the AGENT node 12.12: (1) destructively gets an address from the data stack 40 of the EXECUTOR node 12.11; (2) destructively gets a value from the data stack 40 of the EXECUTOR node 12.11; and (3) writes the value to the address in the tokens storage 110.

The sixth type of token 150 is the one-word RETURNX token 150f, wherein the single word simply identifies the token. Upon receiving the identifier word here the AGENT node 12.12: (1) pops the top element of the return stack 42 of the EXECUTOR node 12.11; and (2) pushes this onto the data stack 40 of the AGENT node 12.12, where it will be interpreted as a new virtual program counter value.

The seventh type of token 150 is the two-word IFX token 150g, wherein the first word identifies the token and the second is an address. Upon receiving the identifier word here the AGENT node 12.12 performs operations conceptually equivalent to this: (1) reads the next word (a potential branch-to address) from the tokens storage 110; and (2) non-destructively reads the top element of the data stack 40 of the EXECUTOR node 12.11 to decide which address to keep, the branch-to address or the next address specified by the virtual program counter. If the element value is zero, (3) the AGENT node 12.12 uses the branch-to address as that from which to fetch the next token from the tokens storage 110. If the element value is non-zero, (4) the AGENT node 12.12: (a) drops the branch-to address from the data stack 40 of the EXECUTOR node 12.11, thus not using it; and (b) proceeds without branching, using the next address specified by the virtual program counter (which was incremented after the last read).

The conceptual approach here can be optimized considerably in actual practice. For example, most skilled programmers would not read a word that might not be used.

The eighth type of token 150 is the two-word –IFX token 150h (pronounced "minus IFX" or "dash IFX"), wherein the first word identifies the token and the second is an address. Upon receiving the identifier word here the AGENT node 12.12 performs operations conceptually equivalent to this: (1) reads the next word (a potential branch-to address) from the tokens storage 110; (2) non-destructively reads the top element of the data stack 40 of the EXECUTOR node 12.11 to decide which address to keep, the branch-to address or the next address specified by the virtual program counter. If the element value is non-negative, (3) the AGENT node 12.12 uses the branch-to address as that from which to fetch the next token from the tokens storage 110. If element value is zero, (4) the AGENT node 12.12 discards it and the branch-to-address, and continues virtual execution with the previously incremented virtual program counter.

Of course, the conceptual approach here too can be optimized considerably in actual practice.

The ninth type of token 150 is the two-word NEXTX token 150i, wherein the first word identifies the token and the second is an address. Upon receiving the identifier word here the AGENT node 12.12 performs operations conceptually equivalent to this: (1) reads the next word (a potential branch-to address) from the tokens storage 110; (2) pops the top element of the data stack 40 of the EXECUTOR node 12.11. If the element value is non-zero, (3) the AGENT node 12.12: (a) decrements the value; (b) pushes the value back onto the return stack 42 of the EXECUTOR node 12.11; and (c) uses the branch-to address as that from which to fetch the next token from the tokens storage 110. If the element value is zero, (4) the AGENT node 12.12 increments the virtual program counter.

And the tenth type of token 150 is the optional one-word STOPX token 150j, wherein the single word simply identifies the token. CAVEAT #1: it is here assumed that the EXECUTOR node 12.11 has stored a return address to continue with other operations, at some later time, say, to resume running a program that it was originally performing before running the virtual program here, and that the EXECUTOR node 12.11 then called the AGENT node 12.12 to run the current virtual program. CAVEAT #2: The existence and the use of the STOPX token 150j are optional, since a program may be intended to run indefinitely and the STOPX token 150j would not be needed in that case. Upon receiving the identifier word here the AGENT node 12.12: (1) has the EXECUTOR node 12.11 return to the return address that it pre-stored for this; and (2) returns to checking its west port 52c for the EXECUTOR node 12.11 to send it an address from which it can fetch a first word of a token 150 from the tokens storage 110.

Figure 5:
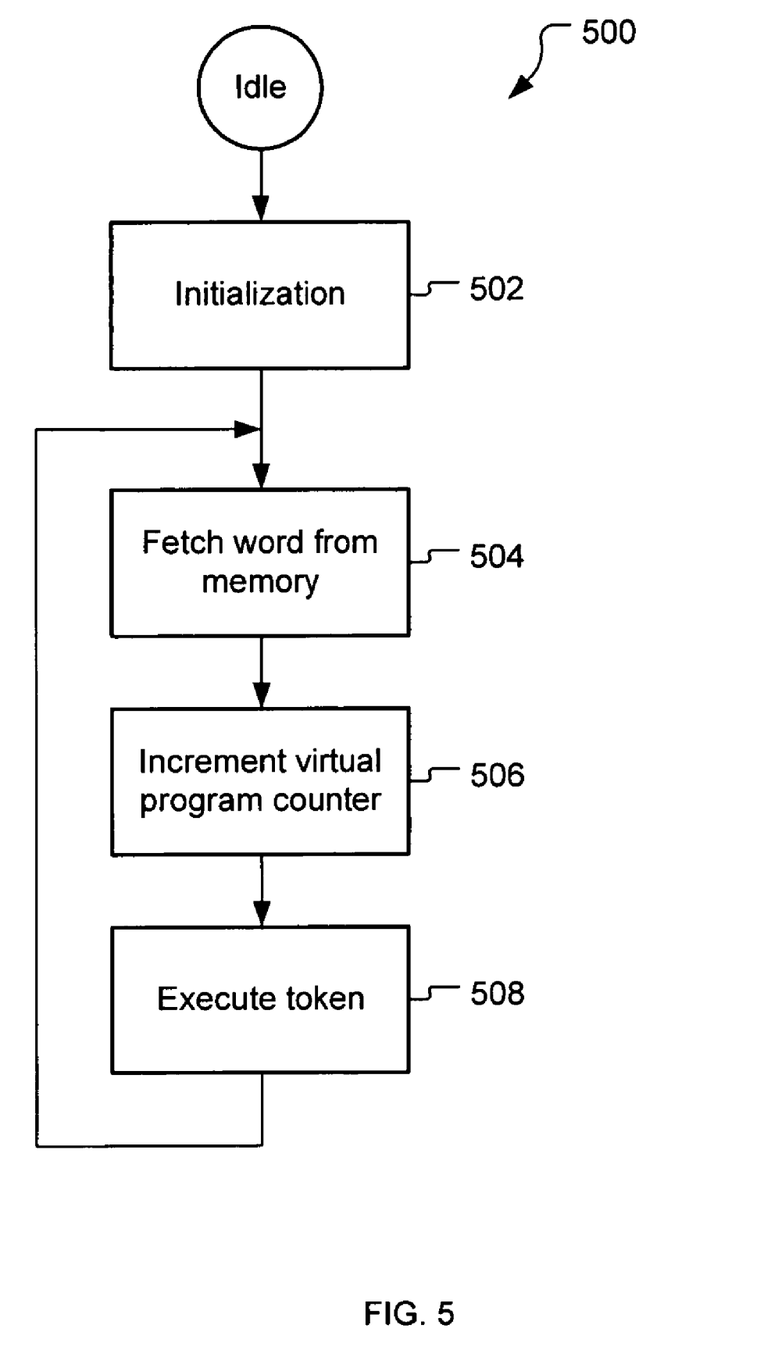
FIG. 5 is a flow chart that shows a process used by the state machine of the agent node in FIG. 3 to execute virtual instructions (the tokens) and pass the appropriate native machine code to the executor node in FIG. 3 for execution.

FIG. 5 is a flow chart that shows a process 500 used by the state machine 140 of the AGENT node 12.12 to execute virtual instructions (the tokens 150) and pass the appropriate native machine code to the EXECUTOR node 12.11 for execution.

In step 502 operations not relevant to the execution of virtual instructions can be performed, such as initialization of the array 10, etc.

In a step 504 the AGENT node 12.12 fetches the first word of a token from the tokens storage 110 at where the virtual program counter specifies. That is, from the address specified in the data stack 40 of the AGENT node 12.12.

In a step 506 the virtual program counter is incremented by a predetermined value (preferably one, but an alternative increment may be used).

And in a step 508 the state machine 140 executes the token 150. Of course, inherent in this is that the process 500 ends (as described above) if the present token 150 is a STOPX token 150j.

Each of the nine not-stop type tokens 150a-i can modify the virtual program counter that specifies where to fetch the next token 150 from in the tokens storage 110. The execution of each such token, however, also needs to leave a valid address in the virtual program counter on the top of the data stack 40 of the AGENT node 12.12.

Summarizing, one node 12 is a dedicated AGENT node 12.12 that fetches tokens 150 from a memory (the tokens storage 110) and executes them. The tokens 150 cause control flow words to be executed in the AGENT node 12.12. The AGENT node 12.12 has a virtual program counter on the top of its data stack 40, so control flow is simply a matter of manipulating that number. Nothing else needs to be maintained on the data stack 40 of the AGENT node 12.12, so the lower elements of this stack are of no concern. One of the tokens 150 (the RUNX token 150*a*) causes a run of instruction words (native code) to be written to a port 52 to a data bus 16 shared with a second node 12 (the EXECUTOR node 12.11). These words are executed from the port 52 of the EXECUTOR node 12.11, so it cannot branch on the stream of native code that it receives. This is why the AGENT node 12.12 has control flow words (i.e., the other tokens 150). The stacks 40, 42 and the memory of the EXECUTOR node 12.11 are thus free to be used by the instruction stream, except that the EXECUTOR node 12.11 may have called its east port 52*d* to initiate all of this so there may be an important address on its return stack 42. The subroutine stack for external words thus is the return stack 42 of the EXECUTOR node 12.11.

While various embodiments have been described above, it should be understood that they have been presented by way of example only, and that the breadth and scope of the invention should not be limited by any of the above described exemplary embodiments, but should instead be defined only in accordance with the following claims and their equivalents.

What is claimed is:

1. A process to execute a program in an array of processor nodes including an agent node and an executor node, comprising:
   (a) providing a virtual program in a memory to represent the program, wherein said virtual program includes a plurality of tokens of different types including at least one run type that includes native code instructions of the executer node;
   (b) loading a said token from said memory into the agent node;
   (c) executing said token in the agent node based on its said type, wherein if said token is a said run type said executing includes sending said native code instructions in said token to the executor node;
   (d) executing said native code instructions as received from the agent node in the executor node; and
   (e) continuing from said (b).

2. The process of claim 1, wherein said virtual program includes more said native code instructions than can be stored in the executor node.

3. The process of claim 1, wherein said memory is not in the same semiconductor die or dies as the agent node or the executor node.

4. The process of claim 1, wherein said plurality of tokens in said virtual program are of potentially ten said different types.

5. The process of claim 1, wherein said different types are members of the set consisting of said run type, a call type, a branch type, a fetch type, a store type, a return type, a next type, and conditional types.

6. The process of claim 1, wherein said plurality of tokens of different types further includes at least one stop type and if said token is a said stop type said executing in said (c) includes ending the process.

7. The process of claim 1, wherein said loading is performed at least in part by one or more of the processor nodes of the array of processor nodes other than the agent node or the executor node.

8. The process of claim 1, wherein said executing said token is performed in a state machine in the agent node.

9. The process of claim 1, wherein said executing said native code instructions is performed in a port of the executer node from which the executor node received said native code instructions from the agent node.

10. The process of claim 1, wherein said (c) includes maintaining a virtual program counter to specify a current location in said virtual program.

11. The process of claim 10, wherein said virtual program counter is maintained in a data stack in the agent node.

12. An apparatus for executing a program, comprising:
    an array of at least two processor nodes, wherein one said processor node is an agent node and another said processor node is an executer node;
    said agent node includes logics that:
        maintain a virtual program counter;
        obtain tokens from a memory of a virtual program that represent the program, wherein said tokens are of a plurality of different types including at least one run type that includes native code instructions of said executer node;
        execute said tokens; and
        write said native code instructions to said executer node; and
    said executer node includes logics that:
        read the native code instructions from said agent node; and
        execute the native code instructions.

13. The apparatus of claim 12 wherein said memory is not in the same semiconductor die or dies as said agent node or said executor node.

14. The apparatus of claim 12, wherein said memory is a synchronous dynamic random access memory.

15. The apparatus of claim 12, wherein said plurality of tokens in said virtual program are of potentially ten said different types.

16. The apparatus of claim 12, wherein said different types are members of the set consisting of said run type, a call type, a branch type, a fetch type, a store type, a return type, a next type, and conditional types.

17. The apparatus of claim 12, wherein said plurality of tokens of different types further includes at least one stop type and if said agent node executes a said token that is a said stop type the apparatus is stopped.

18. The apparatus of claim 12, wherein said agent node includes a state machine in which said executing of said tokens is performed.

19. The apparatus of claim 12, wherein said executor node executes said native code instructions in a port from which said native code instructions are received from said agent node.

20. The apparatus of claim 12, wherein said agent node maintains said virtual program counter in a data stack.

21. The apparatus of claim 12, wherein said array includes at least one storage driver node assists said agent node in obtaining said tokens from said memory.

22. A system to execute a program in an array of processor nodes including an agent node and an executor node, comprising:
    means for providing a virtual program in a memory to represent the program, wherein said virtual program includes a plurality of tokens of different types including at least one run type that includes native code instructions of the executer node;

means for loading a said token from said memory into the agent node;

means for executing said token in the agent node based on its said type, wherein if said token is a said run type said executing includes sending said native code instructions in said token to the executor node;

means for executing said native code instructions as received from the agent node in the executor node; and means for returning to and continuing with said means for loading.

* * * * *